United States Patent

[11] 3,581,620

| [72] | Inventors | Eldon W. Hauck<br>Worcester;<br>Samuel H. Coes, Northboro, both of Mass. |
|---|---|---|
| [21] | Appl. No. | 665,669 |
| [22] | Filed | Aug. 29, 1967 |
| [45] | Patented | June 1, 1971 |
| [73] | Assignee | Norton Company<br>Worcester, Mass. |

[54] ARMORED SEAT FOR AIRCRAFT AND THE LIKE
10 Claims, 4 Drawing Figs.

[52] U.S. Cl. ................................... 89/36,
161/404, 244/122R, 297/217, 297/457
[51] Int. Cl. .................................... B64d 7/00,
F41h 7/00
[50] Field of Search............................................ 89/36, 36
A, 36.5; 244/121, 121.5, 122; 161/193, 404, DIG
4; 297/457, 217

[56] References Cited
UNITED STATES PATENTS
2,142,997  1/1939  Case.............................  244/121
2,738,825  3/1956  McElroy.......................  161/193X
3,127,221  3/1964  Bennett.........................  297/DIG 2

FOREIGN PATENTS
1,213,305  3/1966  Germany......................  89/36A
1,009,977  6/1957  Germany......................  89/36

Primary Examiner—Benjamin A. Borchelt
Assistant Examiner—Stephen C. Bentley
Attorney—Allan R. Redrow ABSTRACT: A laminar seat structure for aircraft or the like having a fiber glass resin with bonded refractory plates forming an armored seat structure adapted for adjustable attachment to conventional support means wherein advantage is taken of the high tensile and compressive strengths of the composite armor structure, in such a way that the tensile stresses imposed on the fiber glass are transmitted to the refractory plates in a manner to take advantage of the high compressive strength characteristic of the plates so that the two strength characteristics of the materials are used to balance one another.

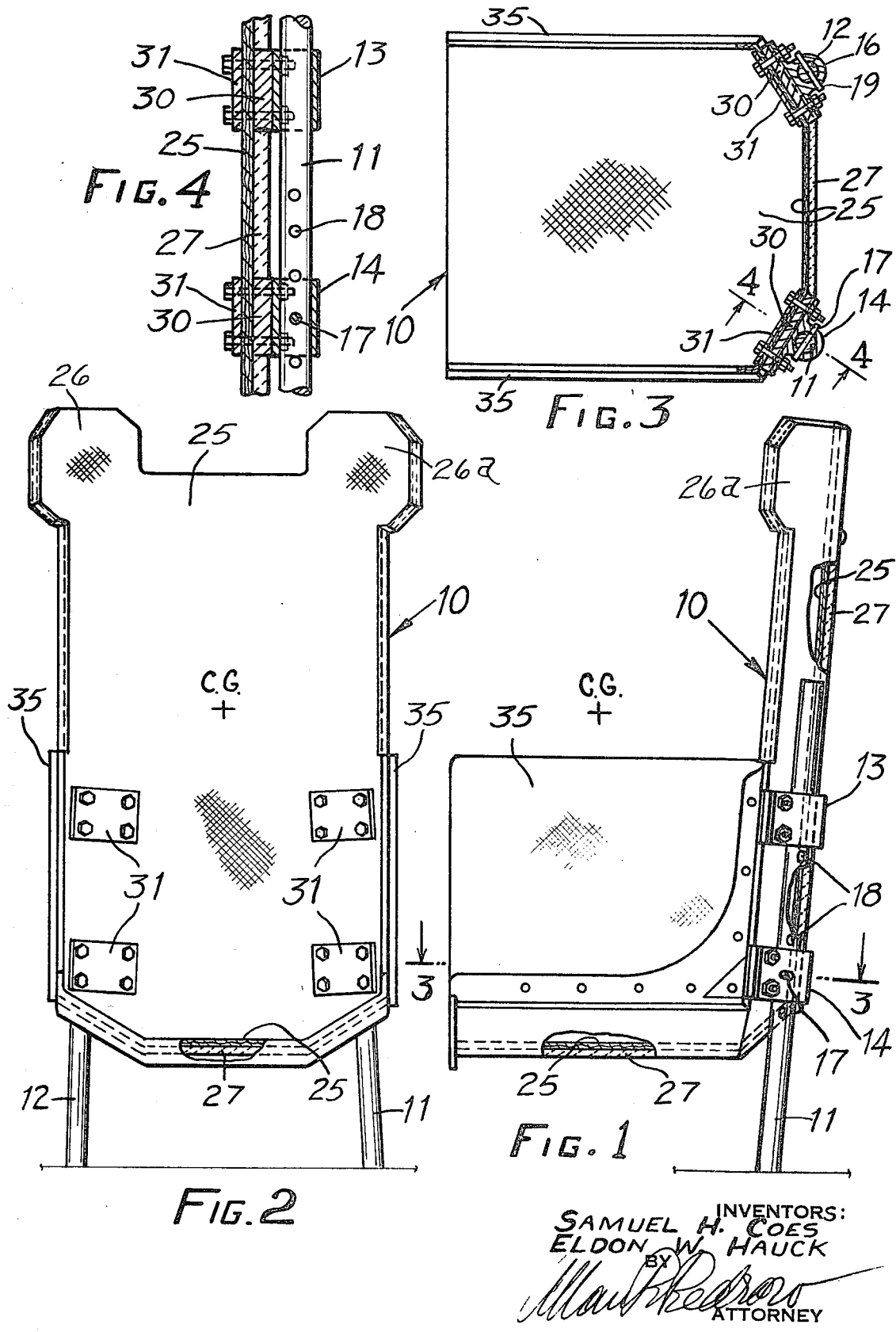

ARMORED SEAT FOR AIRCRAFT AND THE LIKE

RELATED APPLICATIONS

A disclosure of the means for producing a type of plate that can be used with a fiber glass layer to form an armor structure for use in this invention, is disclosed in the U.S. application of R. A. Alliegro Ser. No. 475,940 filed July 30, 1965 for Automatic Hot Pressing of Plates.

BACKGROUND OF INVENTION

In recent years a highly useful armor plate development has been created making use of relatively thin high density plates fabricated from refractory materials such as alumina, silicon carbide, boron carbide and the like. Composite fiber glass and refractory plate structures formed of these materials can be fabricated for mounting in vests for the protection of combat personnel and such structures have also been used for armor when positioned in strategic locations on military vehicles for protecting the vital parts of the machines and the personnel disposed behind the armor.

The refractory plates used for the composite armor structure may be fabricated by following the hot pressing technique disclosed in the above mentioned application. These plates are relatively thin and are more or less heavy depending upon the material from which the plate is made. Such plates when fabricated into the laminated fiber glass structure have the ability of stopping the bullets fired from the usual combat weapons carried by infantry personnel for example.

Boron carbide plates have been found to be particularly useful for lamination with a fiber glass bonded sheet to form an armor adapted for use in aircraft because for a given size and thickness of plate, this composite structure has the same ability to stop projectiles as the other types of fiber glass and refractory plates, the boron carbide composite however being much lighter for any given armoring ability. The composite structure with boron carbide is currently being used on aircraft now in production and in personnel vests particularly for helicopter crew men.

SUMMARY

The present invention provides a particular adaptation of a composite structure for armor making use of a fiber glass support for refractory plate wherein the refractory plates all have relatively high compressive strength and advantage is taken of the tensile strength of the fiber glass and the compressive strength of such plates in the fabrication of a shaped armored seat for the pilot, which laminar structure eliminates the necessity for the wearing of an individual armor vest. Thus in the case of an aircraft, the pilot has more freedom to fly the ship while receiving the benefit of full protection from small arms fire to which he might otherwise be exposed. Also the composite armor structure can be made to be rather form fitting thereby minimizing the total quantity and thus the weight of total armor needed for protection. Since refractory materials are relatively heavy, this saving is important in aircraft. Boron carbide being relatively much lighter than the rest of the refractory plates is particularly well suited for use with the fiber glass layer to form an armor for the pilot or other personnel in such machines.

The present invention provides a laminated structure making use of refractory plates and a resin bonded fiber glass layer integrally secured together for use as a seat in an aircraft. Such a laminated armor seat structure may be mounted on conventional adjustable support means for carrying the pilot's seat and through the interaction of the fiber glass layer and the refractory plate layer, a relatively lightweight armored seat structure may be provided for use in aircraft to provide the pilot with substantially fully shielded environment.

IN THE DRAWINGS

FIG. 1 is a side elevation partly broken away showing the armored seat structure of this invention.

FIG. 2 is a front elevation partly broken away showing the seat structure disclosed in FIG. 1.

FIG. 3 is a view taken on line 3—3 of FIG. 1.

FIG. 4 is a detailed view of the adjustable mounting structure for the seat looking at the full post structure from the direction indicated by line 4—4 of FIG. 3.

DETAILED DESCRIPTION

The invention here disclosed may be embodied in the form of a conventional bucket seat shape found in aircraft such as currently produced for helicopters and the like, the individual weight for each pilot being supported in the seat that is adjustably mounted on posts extending generally vertically from the floor of the vehicle. As shown in FIG. 1, a typical seat structure 10 is shown supported on each side by posts 11 and 12 secured to the floor of the aircraft. The entire seat structure may be moved as a unit up and down generally vertically on these posts to position the seat in the most comfortable position for the pilot. To permit such adjustment of the seat it is provided with suitable slide bearing mountings 13 and 14 mounted on the backside of the back of the seat for cooperating with post 11, and an identical pair of adjustable mounting means one of which, 16 is shown in FIG. 2, for cooperating with post 12.

Referring to FIG. 1, for simplicity sake, we have shown a construction wherein the adjustable mounting 14 is provided with a pin 17 passing through suitable apertures in the mounting 13, for engagement in any one of the cooperating apertures in the series of apertures in post 11. Similarly the adjustable mounting 16 is provided with a pin 19 for cooperating with a suitable aperture in post 12. Thus the seat may be raised or lowered and fixed in adjusted position as required by each pilot. Any conventional clamping structure could of course be substituted for the pin means described above for adjustably mounting the seat on the posts.

The seat structure 10 has an inner layer 25 formed of a molded fiber glass resin bonded material. Techniques for molding a fiber glass reenforced structure to produce relatively lightweight fabricated shapes having a relatively high tensile strength, are well known. For the purpose of this invention the fiber glass member 25 preferably takes the form of a bucket seat shape having a front and backside with a relatively high back supporting portion adapted to engage the pilot's entire back, and extending upwardly to provide protection around the space occupied by his head. At the upper end of the back support, the fiber glass seat member has a pair of wind elements 26 and 26A designed to partially surround the pilot's head. It is seen that the shape of the entire seat structure is designed to rather completely enclose the pilot's body from his knees to the top of his head.

The backside of the fiber glass form is adapted to have refractory tiles fixed thereto to form an integral laminated armor seat structure. As disclosed in the above mentioned copending application refractory tiles can be fabricated that have a relatively thin cross section and of a size such as by 4 inches × 4 inches up to a size in the order of about 24 inches to 30 inches. By making use of this molding technique, a pattern of individual tiles can be fabricated that can be adhesively secured to the backside of the seat structure to form a full layer 27 of refractory tiles on the seat to provide a composite structure that is effective to stop bullets such as are fired from conventional military rifles.

In the preferred form of this invention in order to secure the advantages of the lightness of boron carbide, it is suggested that refractory tiles be fabricated having a thickness of approximately 0.3 inches to 0.4 inches. A pattern of individual tiles may be provided that can be integrally adhered to the backside of the basic fiber glass seat structure with the adjoining edges of all the individual tiles in a tightly fitted abutting relationship. The tiles may be assembled on the fiber glass seat structure with any suitable adhesive, one of the epoxy types of resins serving well for this purpose.

In following this invention, relatively lightweight boron carbide tiles are provided having a density in the range of from 2.3 up to the theoretical density 2.51 grams per cubic centimeter with a compressive strength in the order of 400,000 pounds per square inch. Boron carbide tile has been fabricated in thicknesses of from 0.25 inches to upwards of 0.60 inches for use on fiber glass forms to produce conventional armor plates such as are now used in combat.

In the area of the adjustable mounting elements such as 13, 14 and 16 the layer 27 formed of the individual tiles is designed to have an edge that fits snugly against the four sides of a metal facing plate 30 that is a part of each one of the adjustable mounting elements. The facing plates 30 are each adapted to be mounted in intimate contact with the rear or back surface of the fiber glass seat structure and a cooperating front plate 31 is provided for engagement with the front of the fiber glass layer of the seat structure for distributing the load that must be transmitted from the seat through the mounting means to the support posts 11 and 12 when the seat is occupied. It is essential that each one of the rear facing plates 30 and front plates 31, has a relatively large surface area for engagement with the resin bonded fiber glass layer of the seat in order to distribute the load in a manner to avoid delamination of the fiber glass structure when the seat is subjected to varying load conditions in use.

We have made an armored seat in accordance with this invention in which the fiber glass layer of the bucket seat was one-fourth inch thick and a boron carbide layer three-eighths inch was integrally bonded to the backside of the fiber glass layer with polysulfide adhesive (Proseal). Such an armor structure had the ability to stop a caliber .30 APM2 bullet of 2600 feet per second velocity. The boron carbide layer was produced by making smaller refractory tile shapes in a pattern such that their sides can be tightly fitted together and will have abutting contact with all sides of plates 30. In this particular seat, such plates were made to be 4.6 inches wide, 2.8 inches high and one-half inch thick to cooperate with aluminum plates 31 on the inside of the seat the inside plates being 4.6 inches wide, 2.6 inches high and one-eighth inch thick. Such a seat has been tested by applying G loadings in all directions such as would be encountered under aircraft combat conditions and has been found to be entirely adequate to support an average pilot's weight even though the actual weight supporting element of the seat is in effect a cantilever beam. The basic seat construction as here described is completed by the addition of side panels 35 which may be bolted to suitable side flanges on the bucket seat. Such panels are preferably a laminar fiber glass boron carbide armor material adapted to give the pilot additional side protection.

Referring to FIG. 1, when a pilot of ordinary weight occupies the seat, the center of gravity of his mass is normally positioned somewhat forwardly of the back and above the bottom surface of the seat as indicated by the "+" marked CG. It is apparent that the bottom support of the seat structure here disclosed constitutes a generally cantilever mounted support means and in the normal use of the seat particularly in an aircraft, when coming out of dives for example, a relatively high G load is imposed upon the bottom of the seat. The fiber glass structure along the bottom of the seat is thus subjected to loading which tends to bend it downwardly toward the floor of the vehicle, which stress imposes a tensile stress on the fiber glass layer. When the fiber glass layer begins to change its shape as this tensile stress builds up it tends to displace the armor tile integrally adhered to the bottom side of the fiber glass layer. Due to the interaction of the fiber glass layer in tension and the rigid tile integral with the backside of the fiber glass, a compressive force is imposed on the substance of the refractory tile. Since the tile selected for attachment to the underside of the fiber glass layer has a high compressive strength, it is apparent that the stress loads developed on the several elements of the seat are completely contained by the interaction of the several parts as long as their load limits are not exceeded. The fiber glass layer is placed in tension and since it has excellent tensile strength, the seat portion remains intact as long as the fiber glass is not stretched beyond its elastic limit. Should the tensile stress develop to such an extent as to tend to distort the fiber glass, the stress is immediately transferred to the integral refractory tile layer. Under this change of circumstances, the compressive forces begin to build up in the tile at the same time and it is apparent that tremendous forces can be absorbed within the laminated structure here disclosed which permit the seat to be fully operative under all conditions to which the composite seat structure is normally subjected under flight conditions.

Similarly in the portion of the seat that supports the pilot's back, and considering the mounting of the seat on support bars 11 and 12 by means of the adjustable members such as 13, 14 and 16, as shown in FIG. 4, it is apparent that the loading conditions developed in the several layers of the laminar armor structure are distributed in a manner to impose a tensile stress on the fiber glass front portion of the structure and the refractory tile is placed under compression. Thus as the G load builds up on the cantilever supported bottom of the seat a tendency to pivot about the adjustable element 14 is established which is resisted by a reaction in adjustable element 13, thus the element 13 is placed in tension while the lower member 14 is subjected to compressive forces. If a point is taken midway between the adjustable mountings 13 and 14 it is seen that as a G load is applied in a downward direction on the bottom of the seat, the fiber glass layer between supports 13 and 14 tends to twist about an axis positioned generally horizontally at across elements 14 and 16, causing the fiber glass to tend to be bowed toward the pilot's back so that the fiber glass layer is placed in tension. As the fiber glass layer is subjected to a stress that tends to stretch it, the refractory tile elements integrally bonded to the back surface of the seat are placed in compression so that again the tensile and compressive forces tending to distort the separate elements of the seat structure are controlled and are directed in such a manner as to be imposed upon the individual layers or elements of the laminar structure that are best adapted to absorb the tensile and compressive loads.

As above indicated while we have suggested the use of boron carbide tile for adherence to the backside of a seat construction for aircraft, it is apparent that layers formed of other refractory materials having good compressive strengths could be used to make a composite armor. Refractory tiles made from alumina or silicon carbide or a combination of the various materials conventionally used for this type of laminar fiber glass, tile armor construction could be used. When the seat is to be used in a marine or in a land vehicle where weight is not a critical problem, these other forms of refractory tiles may be used with fiber glass to produce an armor for this purpose equally well.

It is further suggested that this seat may have even more general application wherever a heavy load must be carried. The composite seat structure has been found to be relatively a lightweight structure adapted to contain unusually high loading conditions. It accomplishes this function in a most compact design and therefore will be found to be useful for many unusual situations where heretofore relatively massive structures have been required.

While the above describes the preferred form of out invention, it is apparent that many modifications thereof may occur to those skilled in the art which will fall within the scope of the following claims.

We claim:

1. A composite armored bucket seat for a military vehicle, such as an aircraft or the like, adapted to be supported from spaced apart members fixed to the vehicle structure comprising a molded fiber glass resin member having front and back surfaces for supporting the pilot of the vehicle on its front side, said fiber glass member being constructed to have a high tensile strength, a relatively thin layer of refractory material integrally bonded to the backside of said member, said refractory layer being formed of a high compressive strength material having a high resistance to the impact of bullets of a given caliber, means for adjustably mounting said composite seat on said support members, said means including spaced apart engaging means cooperating with each of said members, each of said engaging means cooperating with its respective support member at relatively widely spaced points, attaching means for fixedly supporting the composite seat structure on said spaced apart engaging means, said attaching means including means engaging the said fiber glass resin member to distribute loading forces widely over the surface of said member to preclude delamination thereof when subjecting the seat to unduly heavy loads.

2. A structure as described in claim 1 wherein the high tensile strength member is a unitary fiber glass resin bonded structure.

3. A structure as in claim 1 wherein the refractory layer is comprised of a number of interfitted blocks having intimate contact with one another along all their adjoining sides.

4. A structure according to claim 3 wherein the blocks are made of a hot pressed boron carbide composition.

5. A structure according to claim 2 wherein the refractory layer attached to said fiber glass member is comprised of a number of interfitted blocks having intimate contact with one another along all their adjoining sides.

6. A structure according to claim 5 wherein the blocks are made of a hot pressed boron carbide composition.

7. A composite armored bucket seat for a military vehicle such as an aircraft or the like adapted to be supported from two spaced apart upright posts fixed to the vehicle comprising a molded fiber glass resin member having front and back surfaces for supporting the pilot of the vehicle on its front side, said fiber glass member being constructed to have a high tensile strength, a relatively thin layer of refractory material integrally bonded to the backside of said member, said refractory layer being formed of a high compressive strength material having a high resistance to the impact of bullets of a given caliber, means for adjustably mounting said composite seat on said upright posts, said means including spaced apart engaging means cooperating with each of said posts, each of said engaging means cooperating with its respective post at relatively widely spaced points, attaching means for fixedly supporting the composite seat structure on said spaced apart engaging means, said attaching means including bearing pads for engaging against the front side of said fiber glass resin member to distribute loading forces widely over the surface of the fiber glass resin layer to preclude delamination thereof when subjecting the seat to unduly heavy loads.

8. A structure according to claim 7 wherein the thin layer of refractory material is composed of interfitted tile elements having intimate contact one with another along all their adjoining sides.

9. A structure according to claim 8 wherein the tiles are formed of hot pressed boron carbide.

10. A structure according to claim 7 wherein the layer of refractory material is formed of hot pressed boron carbide.